US012288930B2

(12) United States Patent
Okazaki (10) Patent No.: US 12,288,930 B2
(45) Date of Patent: Apr. 29, 2025

(54) CONSTRUCTION MACHINE, ANTENNA ATTACHMENT METHOD, AND ANTENNA ATTACHMENT STRUCTURE (71) Applicant: YANMAR POWER TECHNOLOGY CO., LTD., Osaka (JP)

(72) Inventor: Kohei Okazaki, Fukuoka (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 107 days.

(21) Appl. No.: 17/623,097

(22) PCT Filed: Jun. 2, 2020

(86) PCT No.: PCT/JP2020/021706
§ 371 (c)(1),
(2) Date: Dec. 27, 2021

(87) PCT Pub. No.: WO2021/019901
PCT Pub. Date: Feb. 4, 2021

(65) Prior Publication Data
US 2022/0263232 A1 Aug. 18, 2022

(30) Foreign Application Priority Data
Jul. 31, 2019 (JP) .................................. 2019-140402

(51) Int. Cl.
*H01Q 1/32* (2006.01)
*B60R 11/02* (2006.01)
(Continued)

(52) U.S. Cl.
CPC ............. *H01Q 1/325* (2013.01); *B60R 11/02* (2013.01); *E02F 9/16* (2013.01); *H01Q 1/241* (2013.01)

(58) Field of Classification Search
CPC ............ H01Q 1/24; H01Q 1/241; H01Q 1/32; H01Q 1/325; H01Q 1/3233; H01Q 1/22;
(Continued)

(56) References Cited

U.S. PATENT DOCUMENTS 8,955,631 B2 * 2/2015 Nishimura ............ E02F 9/0858
37/379
9,441,344 B2 * 9/2016 Tanaka ...................... E02F 9/16
(Continued)

FOREIGN PATENT DOCUMENTS

JP 2003-112579 A 4/2003
JP 2006-056280 A 3/2006
(Continued)

OTHER PUBLICATIONS

International Search Report and Written Opinion for PCT Patent App. No. PCT/JP2020/021706 (Jul. 21, 2020), with English language translation of the ISR.
(Continued)

*Primary Examiner* — Tho G Phan
(74) *Attorney, Agent, or Firm* — Future IP LLC; Tomoko Nakajima (57) ABSTRACT

A revolving work vehicle includes a lower traveling body and an upper revolving body. The upper revolving body is revolvably supported by the lower traveling body. The upper revolving body comprises: a roof; rear-side support columns; a base body; antenna support columns; and GNSS antennas. The roof is disposed above an operator's seat. The rear-side support columns are disposed as a pair and extend upwards from the rear section of the upper revolving body so as to support the roof. The base body is attached to both of the pair of rear-side support columns so as to connect the pair of rear-side support columns to each other. The antenna columns are disposed as a pair and extend upwards from the
(Continued)

base body at positions which do not overlap with the roof in a plan view. The GNSS antennas are disposed as a pair.

10 Claims, 9 Drawing Sheets

(51) Int. Cl.
    *E02F 9/16* (2006.01)
    *H01Q 1/24* (2006.01)
(58) Field of Classification Search
    CPC .... B60R 11/02; E02F 9/16; E02F 9/08; E02F 9/0858; E02F 9/24; E02F 9/26
    See application file for complete search history.

(56) References Cited

U.S. PATENT DOCUMENTS

| | | | |
|---|---|---|---|
| 9,702,112 B2 * | 7/2017 | Shioji | E02F 9/26 |
| 9,988,787 B1 | 6/2018 | Wang et al. | |
| 11,008,731 B2 * | 5/2021 | Hoshino | B60R 21/13 |
| 11,031,684 B2 * | 6/2021 | Yamada | E02F 9/16 |
| 11,437,713 B2 * | 9/2022 | Kim | H01Q 19/104 |
| 11,569,569 B2 * | 1/2023 | Hanada | H01Q 5/22 |
| 2011/0231061 A1 | 9/2011 | Reeve et al. | |
| 2019/0078302 A1 | 3/2019 | Yamada et al. | |

FOREIGN PATENT DOCUMENTS

| | | |
|---|---|---|
| JP | 2008-038438 A | 2/2008 |
| JP | 2012219516 A | 11/2012 |
| JP | 2017112962 A | 6/2017 |
| JP | 2018114925 A | 7/2018 |
| JP | 2019-109130 A | 7/2019 |
| KR | 101675690 B1 | 11/2016 |
| WO | WO2018/135201 A1 | 7/2018 |
| WO | WO2019/003431 A1 | 1/2019 |

OTHER PUBLICATIONS

Extended European Search Report for Patent App No. 20846000.6 (dated Jul. 18, 2023).

* cited by examiner

Fig. 9 comparative example

CONSTRUCTION MACHINE, ANTENNA ATTACHMENT METHOD, AND ANTENNA ATTACHMENT STRUCTURE

This application is a national phase entry under 35 U.S.C. § 371 of PCT Patent Application No. PCT/JP2020/021706, filed on Jun. 2, 2020, which claims priority under 35 U.S.C. § 119 to Japanese Patent Application No. 2019-140402, filed Jul. 31, 2019, all of which are incorporated by reference.

TECHNICAL FIELD

The present invention mainly relates to a construction machine to which a pair of global navigation satellite system (GNSS) antennas are attached.

BACKGROUND ART

Patent Literature 1 discloses a work vehicle to which a global positioning system (GPS) antenna is attached. The work vehicle is equipped with a fixed member which is rod-shaped and extending vertically. The GPS antenna is attached to the fixed member.

Patent Literature 2 discloses a construction machine including a lower traveling body and an upper revolving body which is revolvably supported with respect to the lower traveling body. The construction machine is equipped with a GPS antenna. Specifically, a hydraulic oil tank is disposed in the upper revolving body, and the GPS antenna is attached to the hydraulic oil tank. Since the hydraulic oil tank is covered by a tank cover, the GPS antenna is also covered by the tank cover, so that the antenna can be protected.

CITATION LIST

Patent Literature

Patent Literature 1: Japanese Unexamined Patent Publication No. 2006-56280
Patent Literature 2: Japanese Unexamined Patent Publication No. 2003-112579

DISCLOSURE OF INVENTION

Problems to be Solved by the Invention

In a construction machine having a lower traveling body and an upper revolving body as in Patent Literature 2, when a GNSS antenna is attached to the upper revolving body, the position of the GNSS antenna changes according to the revolving angle of the upper revolving body. Therefore, it is necessary to install, for example, two GNSS antennas in order to obtain the position of the construction machine with high accuracy. In a case where the GNSS antenna is covered by another member, radio waves may not properly be received from the GNSS satellite.

The present invention has been made in view of the above circumstances, and it is a main object of the present invention to provide a structure for properly arranging a pair of GNSS antennas in a construction machine including a lower traveling body and an upper revolving body.

Means for Solving the Problems

Effect of the Invention

The problem to be solved by the present invention is as described above, and the means for solving the problem and effects thereof will be described below.

According to a first aspect of the present invention, there is provided a construction machine having the following configuration. That is, the construction machine includes a lower traveling body and an upper revolving body. The upper revolving body is supported revolvably by the lower traveling body. The upper revolving body includes a prime mover, an operator seat, a roof, rear support columns, a base body, antenna support posts, and GNSS antennas. The prime mover is disposed at the rear section of the upper revolving body and drives at least the lower traveling body. The operator seat is disposed above the prime mover and the operator is seated on the operator seat. The roof is disposed above the operator seat. The rear support columns are provided as a pair and extend upward from the rear section of the upper revolving body to support the roof. The base body is attached to the pair of rear support columns to connect them together. The antenna support posts are provided as a pair and extend upward from the base body at positions not overlapping the roof in plan view. The GNSS antennas are provided as a pair, and each GNSS antenna is attached to each of the pair of antenna support posts.

This facilitates the GNSS setting, because the relative position of the pair of GNSS antennas is fixed and known as the GNSS antennas are connected to the same base body via the antenna support posts. By attaching the GNSS antennas using the rear support columns in the positional relationship described above, the GNSS antennas can be disposed at positions where the radio waves from the GNSS satellite are hardly blocked by the roof or the like.

In the construction machine described above, the base body preferably includes a pair of attaching members, each attached detachably to each of the pair of rear support columns.

This enables reduction in size of the construction machine in a situation where the GNSS antennas are not necessary (for example, during transportation of the construction machine). If the attaching height of the base body is changeable because, for example, the placement distance between the rear support columns is fixed, the attaching height of the GNSS antennas can be changed.

In the construction machine described above, the base body preferably includes a first adjustment mechanism capable of changing the placement distance between the pair of attaching members.

This allows the base body to be attached to various types of construction machines having different placement distances between the rear support columns. In addition, the attaching height of the base body can also be adjusted for the construction machine in which the placement distance between the rear support columns changes with height.

In the above-described construction machine, the base body, the antenna support posts, and the GNSS antennas are located, in plan view, inside a revolving area having an outer edge defined by the trajectory of an outer edge of a counterweight, which is disposed at the rear end of the upper revolving body, when the counterweight revolves with the upper revolving body.

This prevents enlargement of the revolving area due to the attaching members used to attach the GNSS antennas.

In the construction machine described above, the revolving area is preferably within the vehicle width of the lower traveling body.

Thus, the present invention is applicable to relatively small construction machines in which a major part of the upper revolving body does not extend outside the lower traveling body even during revolving of the upper revolving body.

The construction machine described above preferably has the following configuration. That is, the left ends of the base body, the antenna support posts, and the GNSS antennas are located, in plan view, inside the left end of the lower traveling body in the right-left direction. The right ends of the base body, the antenna support post column, and the GNSS antenna are located, in plan view, inside the right end of the lower traveling body in the right-left direction.

Since the members for attaching the GNSS antennas do not protrude from the lower traveling body in the right-left direction, the GNSS antennas or the like are unlikely to collide with obstacles, for example, in a situation where the construction machine is located in a narrow space.

In the construction machine described above, the base body preferably includes a second adjustment mechanism capable of changing the placement distance between the pair of antenna support posts.

Since the minimum placement distance between the pair of GNSS antennas is fixed according to the specifications of the GNSS antennas, the provision of the second adjustment mechanism makes it possible to support the GNSS antennas of various specifications.

According to a second aspect of the present invention, an antenna attachment method described below is provided. That is, the antenna attachment method is a method of attaching GNSS antennas to a construction machine including a lower traveling body and an upper revolving body. The upper revolving body is revolvably supported by the lower traveling body and includes a pair of rear support columns extending upward from the rear section of the upper revolving body and a roof disposed above the operator seat and supported by the rear support columns. The antenna attachment method includes attaching a base body and attaching antennas. In attaching the base body, the base body is attached to the pair of rear support columns to connect them together. In attaching the antennas, a pair of GNSS antennas is attached to a pair of antenna support posts extending upward from the base body at positions not overlapping the roof in plan view.

According to a third aspect of the present invention, an antenna attachment structure having a configuration described below is provided. That is, the antenna attachment structure attaches the GNSS antennas to a construction machine including a lower traveling body and an upper revolving body. The upper revolving body is revolvably supported by the lower traveling body and includes a pair of rear support columns extending upward from the rear section of the upper revolving body and a roof disposed above the operator seat and supported by the rear support columns. The antenna attachment structure includes a base body, antenna support posts, and GNSS antennas. The base body can be attached to the pair of rear support columns to connect them together. The antenna support posts are provided as a pair and extend from the base body. The GNSS antennas are provided as a pair, and each GNSS antenna is attached to each of the pair of antenna support posts.

DESCRIPTION OF EMBODIMENTS

Figure 1:
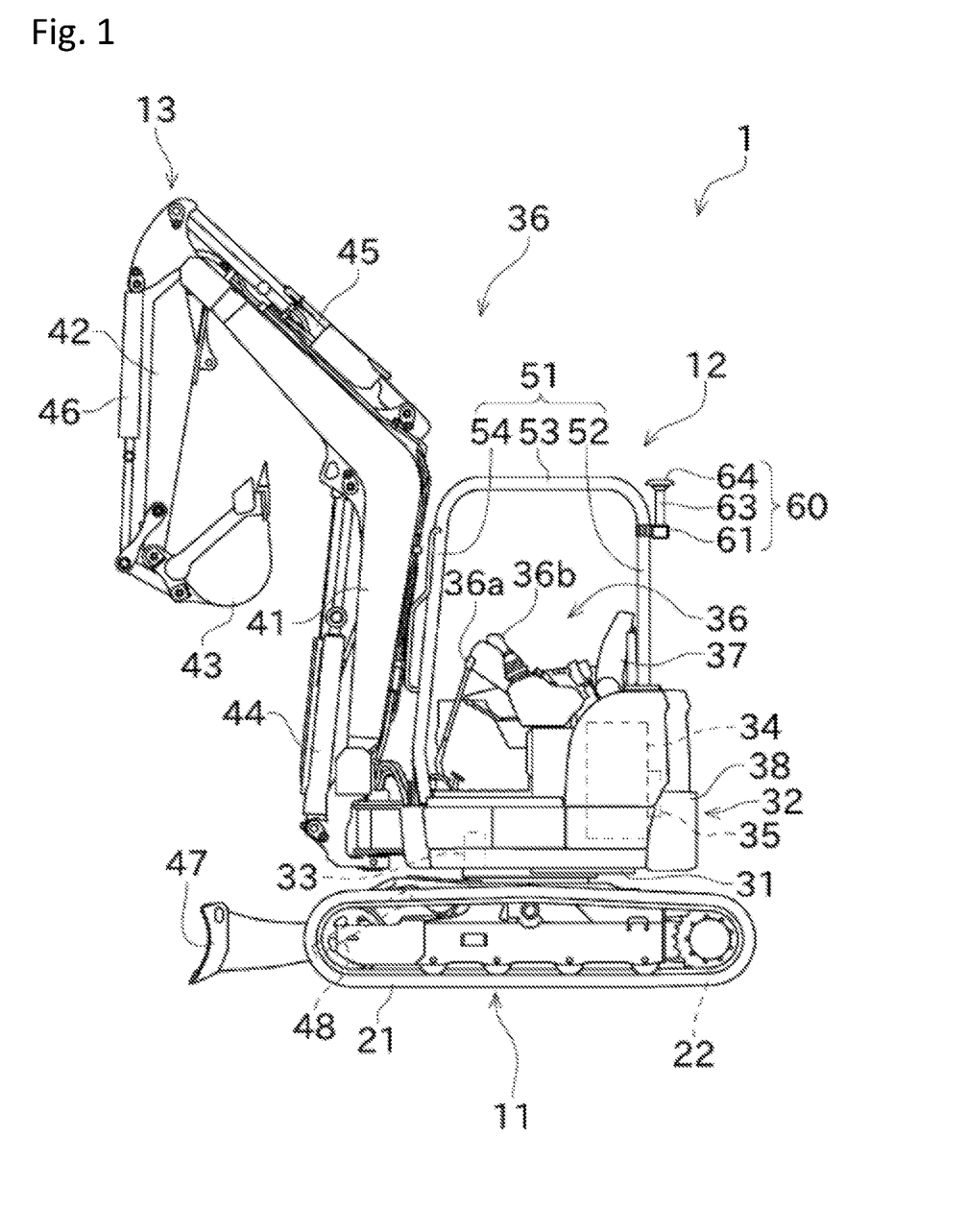
FIG. 1 is a side view illustrating an overall configuration of a revolving work vehicle according to an embodiment of the present invention.

An embodiment of the present invention will be described below with reference to the accompanying drawings. FIG. 1 is a side view illustrating an overall configuration of a revolving work vehicle 1 according to an embodiment of the present invention.

A revolving work vehicle (construction machine, hydraulic shovel) 1 illustrated in FIG. 1 includes a lower traveling body 11 and an upper revolving body 12.

The lower traveling body 11 includes a crawler travel device 21 and a hydraulic motor 22. The crawler travel device 21 and the hydraulic motor 22 are provided as a pair and disposed on both right and left sides.

Each crawler travel device 21 includes an endless crawler made of, for example, rubber. The crawler is wound around a sprocket, and the sprocket is coupled to an output shaft of the hydraulic motor 22 disposed on the same side as the crawler travel device 21.

Each hydraulic motor 22 is configured to rotate forward and backward to allow the revolving work vehicle 1 to move forward and backward. The hydraulic motors 22 are configured to be operable separately on the right and left sides to allow the revolving work vehicle 1 to move linearly or to change the direction of the revolving work vehicle 1 (lower traveling body 11).

The upper revolving body 12 includes a revolving frame 31, a vehicle body 32, a revolving motor 33, an engine (prime mover) 34, a hydraulic pump unit 35, a operation unit 36, an operator seat 37, a GNSS antenna 64, work equipment 13, and a counterweight 38.

The revolving frame 31 is disposed above the lower traveling body 11, and supported by the lower traveling body 11 to revolve about an axis extending in the vertical direction. The vehicle body 32 is fixed to the revolving frame 31 to rotate integrally with the revolving frame 31. The vehicle body 32 is nearly circular in plan view (specifically, the front portion is shaped linearly) to constitute a part of the side face of the upper revolving body 12. Space is formed inside the vehicle body 32, in which and the revolving motor 33, the engine 34, the hydraulic pump unit 35, and so on are disposed.

The revolving motor 33 generates a driving force to rotate the revolving frame 31 and the vehicle body 32 with respect to the lower traveling body 11. The engine 34 is disposed in the rear section of the upper revolving body 12. The rear section indicates, for example, the section located behind the center in the front-back direction. The engine 34 is configured as, for example, a diesel engine. The engine 34 may be a gasoline engine. An electric motor may also be provided in addition to or instead of the engine 34. The hydraulic pump unit 35 is driven by the engine 34 to generate the oil pressure necessary for traveling and working of the revolving work vehicle 1.

The operation unit 36 includes various control members. For example, the control members include a travel control lever 36a and a work control lever 36b provided as a pair and disposed on the right and left. The operator seat 37 is disposed above the engine 34 and near the operation unit 36. The operator is seated on the operator seat 37 and operates the above-described control members to provide various instructions to the revolving work vehicle 1. The GNSS antenna 64 is disposed behind the operator seat 37. The details of the mounting method of the GNSS antenna 64 will be described later.

The work equipment 13 includes a boom 41, an arm 42, a bucket 43, and a blade (soil removal plate) 47. The work equipment 13 also includes, as actuators, a boom cylinder 44, an arm cylinder 45, a bucket cylinder 46, and a blade cylinder 48.

The boom 41 is configured as an elongated member with its base end being rotatably supported on the front of the vehicle body 32. The boom cylinder 44 is attached to the boom 41, allowing the boom cylinder 44 to expand and contract to rotate the boom 41.

The arm 42 is configured as an elongated member with its base end being rotatably supported by the distal end of the boom 41. The arm cylinder 45 is attached to the arm 42, allowing the arm cylinder 45 to expand and contract to rotate the arm 42.

The bucket 43 is configured as a container-shaped member with its base end being rotatably supported by the distal end of the arm 42. The bucket cylinder 46 is attached to the bucket 43, allowing the bucket cylinder 46 to expand and contract to rotate the bucket 43 and perform a scooping operation or a dumping operation.

The blade 47 is provided to extend in a direction of a width of the vehicle body (right-left direction). The blade 47 is disposed in front of the lower traveling body 11. The blade 47 is rotatably supported relative to the lower traveling body 11 about an axis extending in the right-left direction. The blade cylinder 48 is attached to the blade 47, allowing the blade cylinder 48 to extend and contract to move the blade 47 up and down.

In the present embodiment, the boom cylinder 44, the arm cylinder 45, the bucket cylinder 46, and the blade cylinder 48 are all formed by hydraulic cylinders. These hydraulic cylinders expand and contract by the hydraulic power generated by the hydraulic pump unit 35.

The counterweight 38 is a weight for stabilizing the revolving work vehicle 1 equipped with the work equipment 13, which is a heavy object, on the front. For this purpose, the counterweight 38 is located at the rear end of the upper revolving body 12. In plan view, the outer edge (peripheral surface) of the counterweight 38 is arc-shaped.

Next, a method of attaching the GNSS antenna 64 will be described in detail with reference to FIGS. 2 to 4.

When the upper revolving body 12 revolves with respect to the lower traveling body 11, the front and rear of the lower traveling body 11 and the front and rear of the upper revolving body 12 do not match. For the purpose of describing the configuration of the upper revolving body 12, the front and rear of the upper revolving body 12 will simply be referred to as front and rear below.

Figure 3:
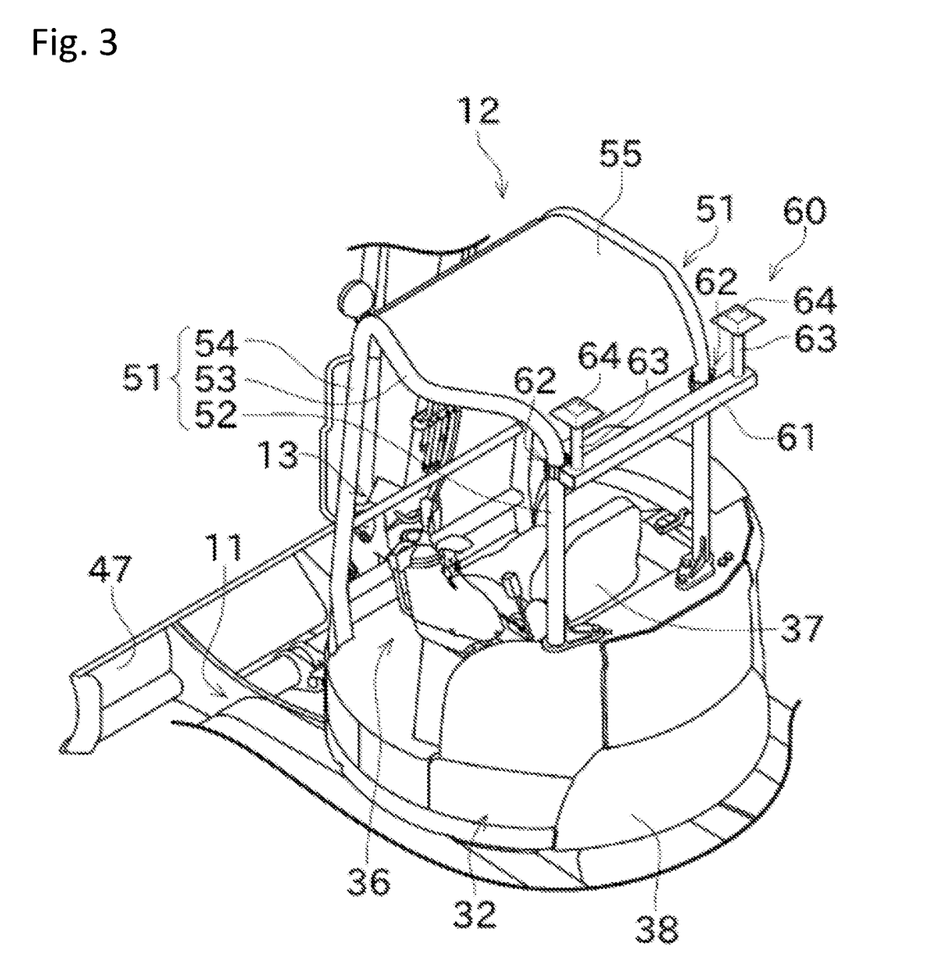
FIG. 3 is a schematic view illustrating a rear section of an upper revolving body.
Figure 4:
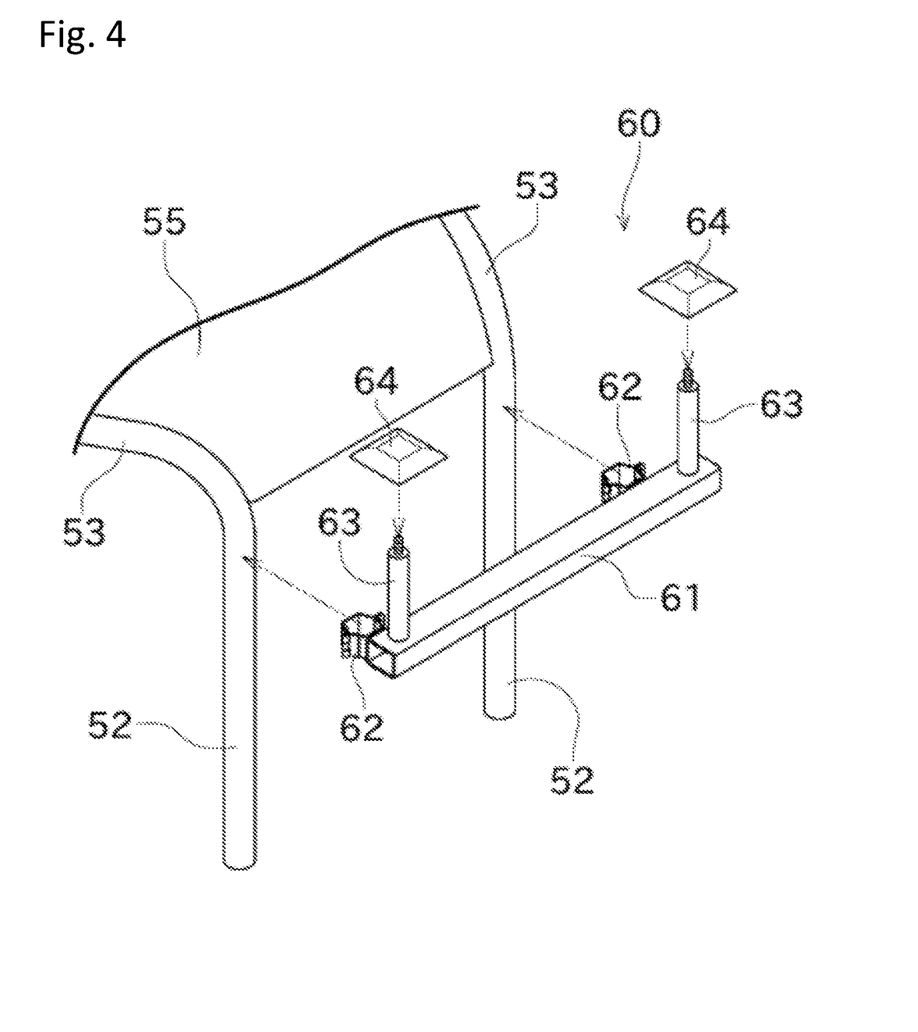
FIG. 4 is an exploded schematic view of an antenna attachment structure.

As illustrated in FIGS. 3 and 4, for example, two GNSS antennas 64 are attached to the revolving work vehicle 1. This is because the position information of the work equipment 13 of the revolving work vehicle 1 needs to be acquired in implementing the information-based construction according to, for example, machine control technology or machine guidance technology. In particular, to detect the position information of the work equipment 13 in the revolving work vehicle 1, even when the upper revolving body 12 revolves with respect to the lower traveling body 11, the position of the revolving work vehicle 1 and the information of a revolving angle of the upper revolving body 12 are needed. To obtain these values, the detection results of the two GNSS antennas 64 are needed. The relative position of the two GNSS antennas 64 relative to the revolving work vehicle 1 is also needed to obtain these values. To obtain these values with high accuracy, the placement distance between the two GNSS antennas 64 needs to be equal to or greater than a specified value (minimum placement distance).

As illustrated in FIG. 3, the revolving work vehicle 1 includes roof support units 51 and a roof 55, and the GNSS antennas 64 are attached to the roof support units 51. The roof support units 51 are provided as a pair and disposed on the right and left, and the GNSS antennas 64 are attached at two positions corresponding to the two roof support units 51. As illustrated in FIG. 2, the right and left roof support units 51 are different in shape, but have the same function, so that the description is given below as the same units. The right and left roof support units 51 may be in the same shape or provided symmetrically.

As illustrated in FIG. 3, the roof support units 51 each include a rear support column 52, a roof attaching unit 53, and a front support column 54. The roof support unit 51 may be formed by curving a member (pipe material) or coupling a plurality of members by welding or with bolts.

The rear support column 52 is a member (with its longitudinal direction being parallel with the vertical direction) extending upward from the rear section of the upper revolving body 12. The rear section of the upper revolving body 12 corresponds to a section behind the center of the upper revolving body 12 in the front-back direction (more particularly, the rearmost section of the upper revolving body 12 when it is divided into four equal parts in the front-back direction). In another perspective, the rear support column 52 extends upward from behind the mounting position of the operator seat 37. The rear support column 52 is fixed to the vehicle body 32 with bolts or the like. The rear support column 52 may extend diagonally upward.

The roof attaching unit 53 is connected to the upper end of the rear support column 52. The roof attaching unit 53 extends front to back. The roof 55 is disposed so as to connect the pair of right and left roof attaching units 53. The roof 55 is disposed to cover the upper side of the operation unit 36 and the operator seat 37.

The front support column 54 is a member extending upward from the front section of the upper revolving body 12. The front section is defined corresponding to the definition of the rear section. The front end of the roof attaching unit 53 is coupled to the upper end of the front support column 54.

Thus, the revolving work vehicle 1 of the present embodiment is so-called a canopy-type revolving work vehicle having the roof disposed on the columns. In other words, the revolving work vehicle 1 of the present embodiment is not a cabin-type revolving work vehicle, so that the operation space in which the operation unit 36 and the operator seat 37 are disposed is not partitioned from the outside. The revolving work vehicle 1 of the present embodiment is so-called a four-column canopy-type revolving work vehicle, as it has two columns each at the front and the rear. The revolving work vehicle 1 may be a two-column canopy-type revolving work vehicle by omitting the front support columns 54.

Next, the antenna attachment structure 60 is described. The antenna attachment structure 60 is a structure for attaching the GNSS antennas 64 to the revolving work vehicle 1. As illustrated in FIGS. 3 and 4, the antenna attachment structure 60 includes a base body 61, antenna support posts 63, and the GNSS antennas 64.

The base body 61 is a member extending to the right and left. As illustrated in FIG. 3, the base body 61 is disposed behind the pair of right and left rear support columns 52 to connect them together. Specifically, a pair of right and left attaching members 62 is attached to the front side of the base body 61 to attach the base body 61 to the rear support columns 52.

The attaching members 62 are clamping members attached to the rear support columns 52 by tightening bolts while gripping the rear support columns 52. A placement distance between the attaching members 62 in the right-left direction is the same as a placement distance between the rear support columns 52 in the right-left direction. Accordingly, the pair of right and left attaching members 62 is attached to the pair of right and left rear support columns 52. A stretchable member, such as rubber, may be disposed between the attaching members 62 and the rear support columns 52. The attaching members 62 are detachable from the rear support columns 52 when the gripping is released by loosening the bolts.

By providing such detachable attaching members 62, the GNSS antenna 64 can easily be added to an existing revolving work vehicle 1. For example, when the revolving work vehicle 1 is loaded onto a truck or the like for transportation, the size of the revolving work vehicle 1 can be reduced by removing the antenna attachment structure 60, so as not to exceed, for example, the maximum loading size of the truck. When the placement distance between the rear support columns 52 is fixed, the attaching height of the antenna attachment structure 60 can easily be adjusted.

The antenna support posts 63 are vertically extending members attached to the upper surface of the base body 61 on the right and left as a pair. As illustrated in FIG. 4, the upper part of the antenna support post 63 has a protruding portion with a threaded groove formed around it. As described above, it is desirable to keep the two GNSS antennas 64 as far apart as possible. In the present embodiment, therefore, the placement distance between the antenna support posts 63 is larger than the placement distance between the attaching members 62 (placement distance between the rear support columns 52). However, both placement distances may be the same, or the placement distance between the antenna support posts 63 may be smaller.

The GNSS antennas 64 are provided as a pair, one on the left and one on the right, and are attached to the top of the pair of antenna support posts 63. Specifically, a screw hole is formed on the underside of each GNSS antenna 64 to attach the GNSS antenna 64 to the antenna support post 63 by aligning the screw hole of the GNSS antenna 64 with the protruding portion of the antenna support post 63 and rotating the GNSS antenna 64. Rotating the GNSS antenna 64 reversely, it can be removed from the antenna support post 63. By making the GNSS antennas 64 to be detachable, the GNSS antennas 64 can be removed when not in use to prevent theft.

The GNSS antennas 64 receive signals from the GNSS satellite that constitutes a satellite positioning system like GPS. A positioning signal received by the GNSS antennas 64 is input to a receiving unit not shown to perform positioning operation. By performing the positioning operation, the position information of the revolving work vehicle 1 (in particular, the position information of the GNSS antennas 64) is calculated to obtain, for example, latitude and longitude information. Simultaneously, the revolving angle of the upper revolving body 12 is also calculated.

The antenna attachment structure 60 is attached behind the rear support columns 52. Accordingly, in the plan view of the revolving work vehicle 1 (FIG. 2), the antenna support posts 63 and the GNSS antennas 64 are arranged at positions not overlapping the roof 55. Thus, the positioning signals from the GNSS satellite can hardly be blocked by the roof 55. As illustrated in FIG. 1, the upper ends of the GNSS antennas 64 are at the same height as or slightly lower than the upper ends of the roof attaching unit 53 (or roof 55). This decreases the possibility of objects falling from above to directly hit the GNSS antenna 64. Since the boundary between the rear support column 52 and the roof attaching unit 53 is gently curved instead of being bent at a right angle, the placement distance between the roof support unit 51 and the GNSS antenna 64 can be increased. This facilitates reception of the positioning signals from the GNSS satellite. The GNSS antennas 64 may be attached at positions higher than the roof attaching units 53 to further facilitate the reception of the positioning signals from the GNSS satellite.

In performing the antenna attachment method to attach the GNSS antennas 64 to the revolving work vehicle 1, the base body 61 is first attached to both of the pair of rear support columns 52 so as to connect them together (attaching the base body). Next, the pair of GNSS antennas 64 is attached to the pair of antenna support posts 63 extending upward from the base body 61 (attaching the antennas). The order of the above steps is an example and may be different. That is, the base body 61 may be attached to the rear support columns 52 after the GNSS antennas 64 are attached to the antenna support posts 63.

Figure 2:
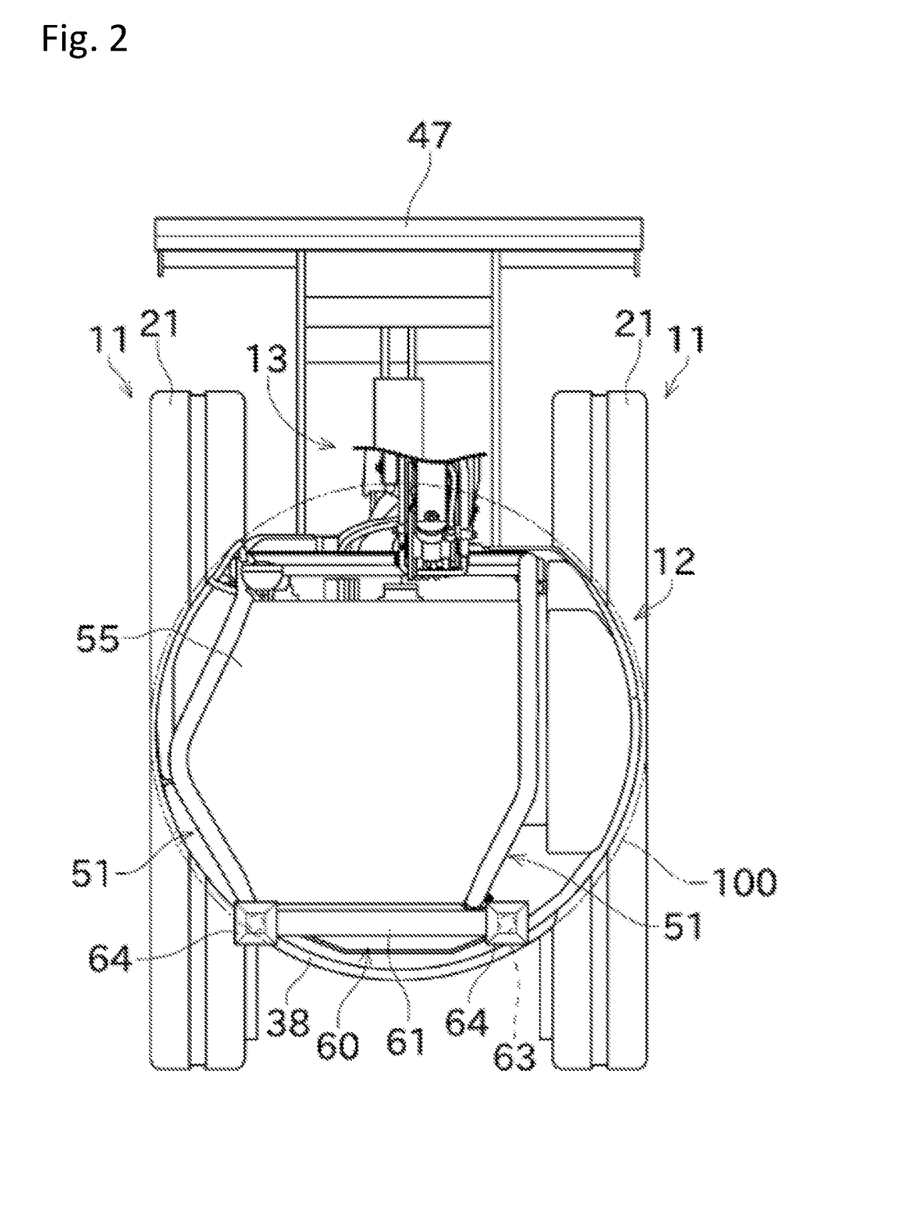
FIG. 2 is a plan view of the revolving work vehicle.

Next, with reference to FIG. 2, the position of the antenna attachment structure 60 relative to a revolving area 100 of the revolving work vehicle 1 is described. In the following description, the revolving area 100 is an area, in plan view, having an outer edge defined by the trajectory (circle or arc) of an outer edge of the counterweight 38 when it revolves with the upper revolving body 12 (an area inside the outer edge of the trajectory). From another perspective, the revolving area 100 may be regarded as an area where the vehicle body 32 of the upper revolving body 12 revolves in plan view, an area where a portion of the upper revolving body 12 excluding the work equipment 13 and the antenna attachment structure 60 revolves in plan view, or an area where the rear section of the upper revolving body 12 (the section behind the center in the front-back direction and excluding the antenna attachment structure 60) revolves.

In the revolving work vehicle 1 of the present embodiment, the revolving area 100 is located inside the lower traveling body 11 in the right-left direction (in other words, the revolving area 100 is located within the vehicle width of the lower traveling body 11). Specifically, the revolving center corresponds to the center of the revolving work vehicle 1 in the right-left direction. The diameter of the revolving area 100 is smaller than a right-left width of the lower traveling body 11 (specifically, a length from the left end of the left lower traveling body 11 to the right end of the right lower traveling body 11). In other words, the upper revolving body 12 is not positioned outside the lower traveling body 11 even during revolving of the upper revolving body 12. The diameter of the revolving area 100 may be larger than the right-left width of the lower traveling body 11. Even in this case, it is preferable that the diameter of the revolving area 100 is smaller than 1.2 times the right-left width of the lower traveling body 11.

The antenna attachment structure 60 of the present embodiment is smaller than the right-left width of the lower traveling body 11 and does not protrude from the lower traveling body 11 in the right-left direction. In other words, the right and left ends of the antenna attachment structure 60 are located inside the ends of the lower traveling body 11 in the right-left direction. Basically, therefore, when the lower traveling body 11 has a sufficient width for travel, the antenna attachment structure 60 does not collide with obstacles.

The antenna attachment structure 60 of the present embodiment is entirely located inside the revolving area 100, except for a portion of the left end. Since the protruding amount of the antenna attachment structure 60 from the revolving area 100 is very small, the antenna attachment structure 60 is unlikely to collide with obstacles during revolving of the upper revolving body 12. Alternatively, as illustrated in a first modification below, the entire antenna attachment structure 60 may be positioned inside the revolving area 100.

Figure 5:
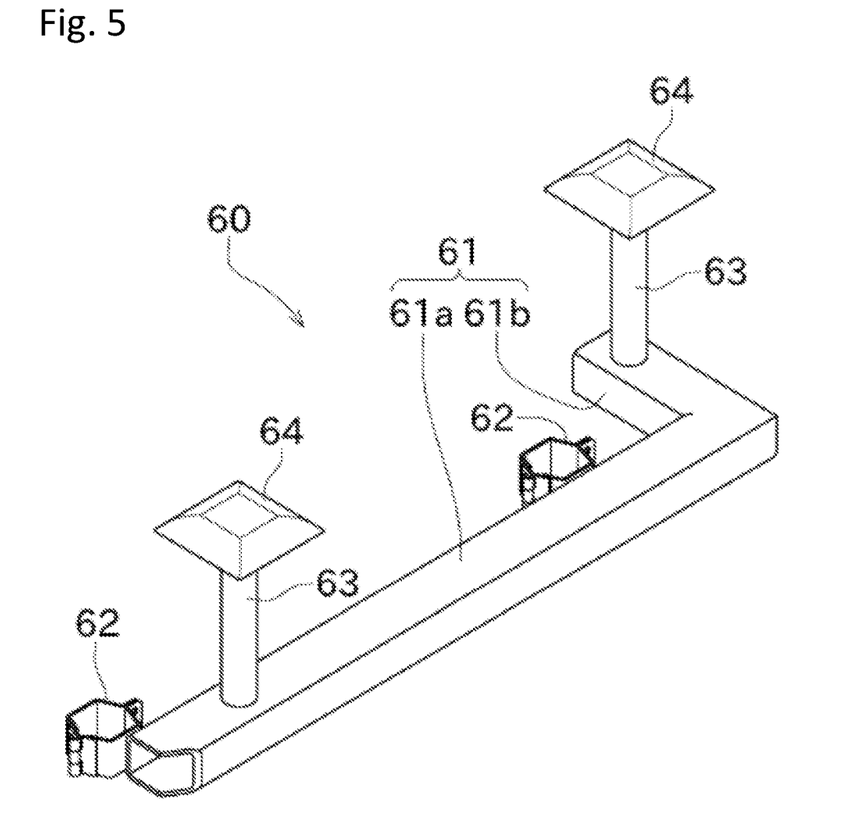
FIG. 5 is a schematic view of the antenna attachment structure included in the revolving work vehicle according to a first modification.
Figure 6:
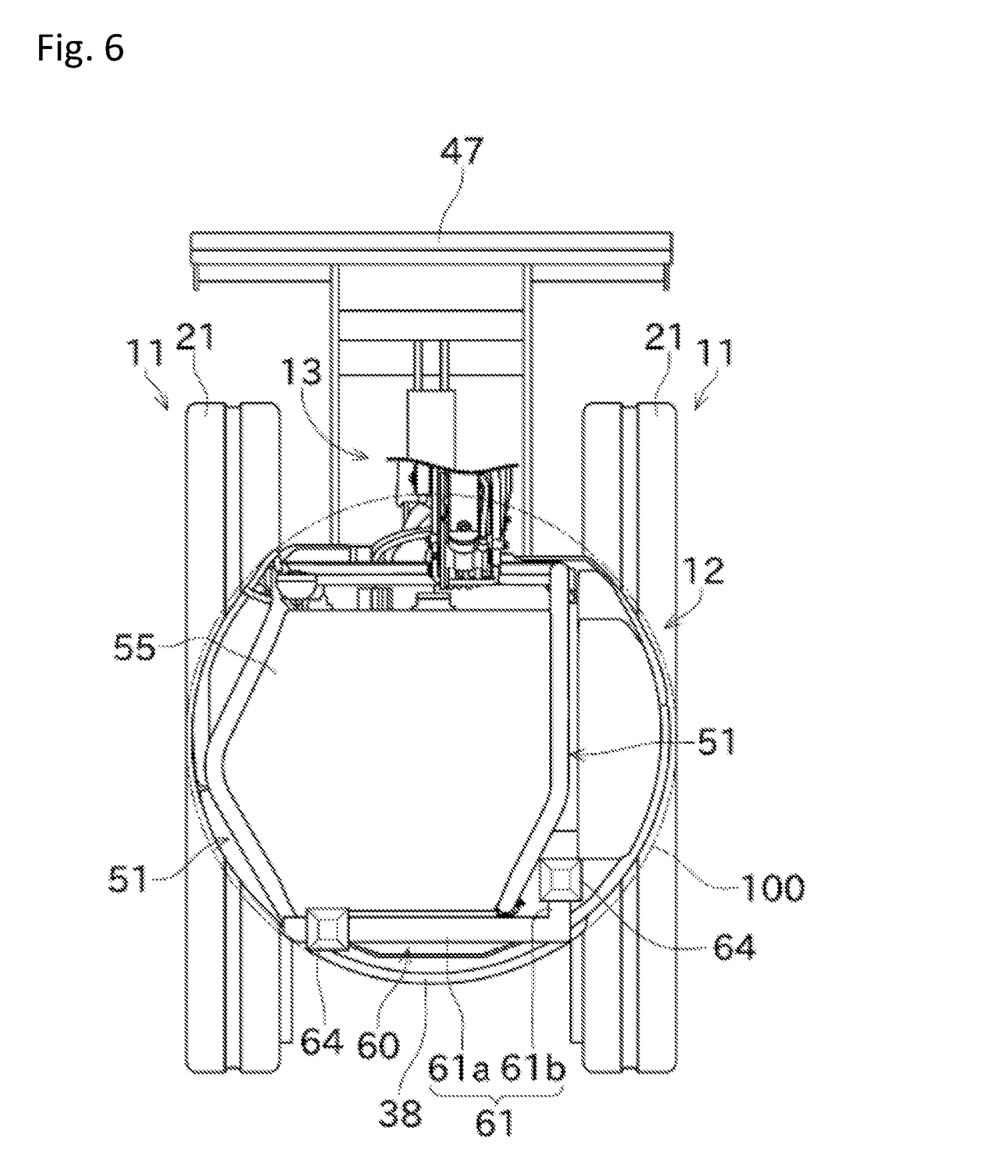
FIG. 6 is a plan view of the revolving work vehicle according to the first modification.

Next, a first modification is described with reference to FIGS. 5 and 6. In the following description, the constituent components identical to or similar to those of the above-described embodiment are marked with the same signs in the drawings and may be omitted from the description.

The revolving work vehicle 1 of the first modification includes the antenna attachment structure 60 capable of positioning the antenna attachment structure 60 inside the revolving area 100, while keeping the placement distance between the GNSS antennas 64 to be not excessively small. The first modification mainly differs from the embodiment described above in the structure of the base body 61. Specifically, the base body 61 of the first modification is L-shaped in plan view. In other words, the base body 61 includes a first portion 61a and a second portion 61b.

Like the base body 61 of the embodiment described above, the first portion 61a extends to the right and left to connect the pair of right and left rear support columns 52 together. The two attaching members 62 are both attached to the first portion 61a. The antenna support post 63 is disposed on the first portion 61a at a position near the end (specifically, at a short distance away from the end) on the side opposite to the boundary with the second portion 61b.

The attaching member 62 is attached to the end of the base body 61, and the antenna support post 63 is disposed at a short distance away from the end of the base body 61 (for example, at a position where the attaching member 62 and the GNSS antenna 64 do not overlap in plan view). This allows the GNSS antennas 64 to be positioned inside the revolving area 100, as illustrated in FIG. 6. In addition, the left end of the first portion 61a (where the attaching member 62 is attached) has its rear corner dropped (chamfered). This allows the base body 61 to be positioned inside the revolving area 100, as illustrated in FIG. 6.

The second portion 61b is a portion that extends forward from the boundary with the first portion 61a. Accordingly, the longitudinal direction of the first portion 61a intersects (is orthogonal to) the longitudinal direction of the second portion 61b. In the second portion 61b, the antenna support post 63 is disposed near the end on the side opposite to the boundary with the first portion 61a. The corner of the right end of the first portion 61a (the rear end of the second portion 61b) is not dropped, but may be dropped.

By positioning the antenna attachment structure 60 inside the revolving area 100, the antenna attachment structure 60 is not positioned outside the revolving area 100 even during revolving of the upper revolving body 12. Further, as in the embodiment described above, since the revolving area 100 is positioned inside the lower traveling body 11 in the right-left direction, the antenna attachment structure 60 is not positioned outside the lower traveling body 11 even during revolving of the upper revolving body 12. This decreases the possibility of the antenna attachment structure 60 colliding with obstacles.

By providing the second portion 61b and disposing the GNSS antenna 64 on the second portion 61b, the placement distance between the GNSS antennas 64 can be increased compared to the configuration in which the GNSS antennas 64 are mounted on the linear-shaped base body 61.

Next, a second modification is described with reference to FIG. 7. The second modification differs from the embodiment described above in that the base body 61 includes a first adjustment mechanism 70. The first adjustment mechanism 70 is a mechanism for adjusting the placement distance between the pair of right and left attaching members 62.

Figure 7:
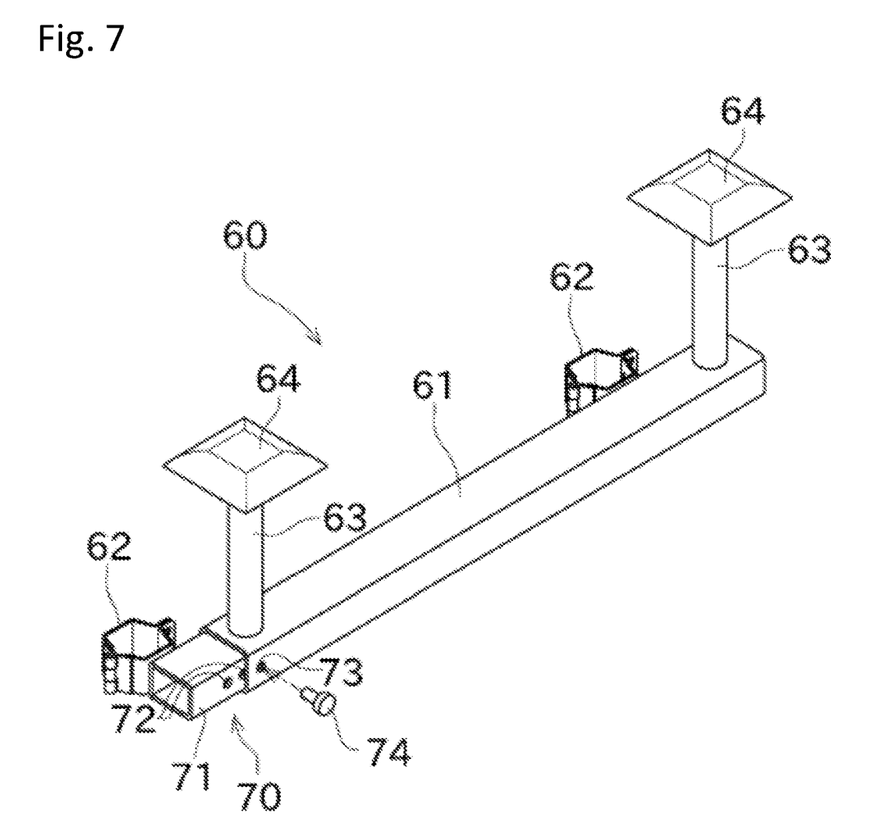
FIG. 7 is a schematic view of an antenna attachment structure provided in a revolving work vehicle according to a second modification.

As illustrated in FIG. 7, the first adjustment mechanism 70 includes an inner member 71 which is slidably inserted into the base body 61. The attaching member 62 is attached to the inner member 71. The inner member 71 has a plurality of inner holes 72 formed for positioning. Correspondingly, the base body 61 also has an outer hole 73 for formed for positioning. After aligning the inner hole 72, which corresponds to a desired placement distance between the attaching members 62, with the outer hole 73, the inner member 71 is attached to the base body 61 by fastening a bolt 74.

If the placement distance between the attaching members 62 and the placement distance between the rear support column 52 do not match, the antenna attachment structure 60 cannot be attached to the rear support columns 52. In this respect, the placement distance between the attaching members 62 can be adjusted in the second modification, allowing the antenna attachment structure 60 to be attached to various revolving work vehicles 1. The antenna attachment structure 60 can also be attached at a desired height even in the revolving work vehicle 1 in which the placement distance between the rear support columns 52 changes as they move upward.

The configuration for adjusting the placement distance between the attaching members 62 is not limited to the above structure. For example, the attaching members 62 may be detachable from the base body 61, and a plurality of holes or the like for attaching the attaching members 62 may be formed in the base body 61.

Next, a third modification is described with reference to FIG. 8. The third modification differs from the above embodiment in that the base body 61 includes a second adjustment mechanism 80. The second adjustment mechanism 80 is a mechanism for adjusting the placement distance between the pair of right and left antenna support posts 63.

Figure 8:
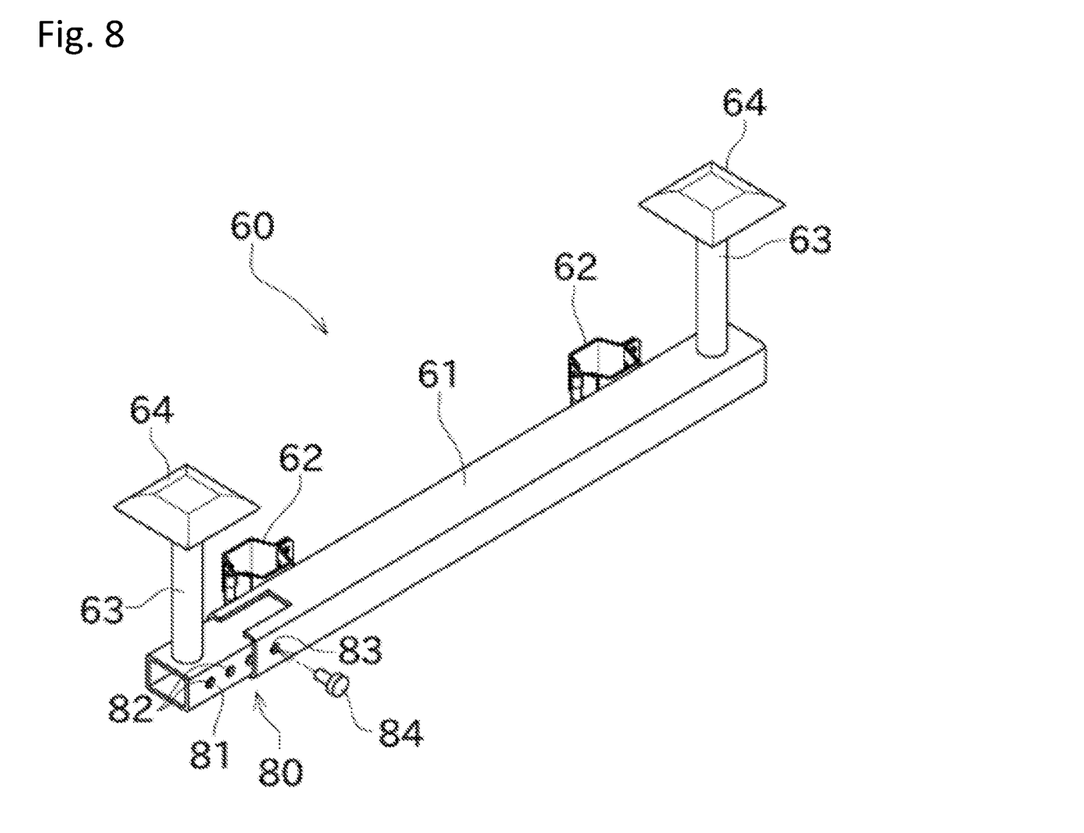
FIG. 8 is a schematic diagram of an antenna attachment structure provided in a revolving work vehicle according to a third modification.

As illustrated in FIG. 8, the second adjustment mechanism 80 includes an inner member 81 which is slidably inserted into the base body 61. The antenna support post 63 is attached to the inner member 81. The inner member 81 has a plurality of inner holes 82 formed for positioning. Correspondingly, the base body 61 has an outer hole 83 formed for positioning. After aligning the inner hole 82, which corresponds to a desired placement distance between the GNSS antennas 64, with the outer hole 83, the inner member 81 is attached to the base body 61 by fastening a bolt 84.

As described above, a larger placement distance between the two GNSS antennas 64 is preferred. Specifically, in order to properly detect the position or the like of the revolving work vehicle 1, the placement distance between the GNSS antennas 64 needs to be larger than the minimum placement distance. The minimum placement distance varies depending on the types of the GNSS antennas 64. In this respect, the placement distance between the antenna support posts 63 (GNSS antennas 64) can be adjusted in the second modification, allowing the GNSS antennas 64 to be attached to satisfy the condition of the minimum placement distance according to the type of the GNSS antennas 64.

The configuration for adjusting the placement distance between the antenna support posts 63 is not limited to the above configuration. For example, the antenna support posts 63 may be detachable from the base body 61, with a plurality of holes or the like formed in the base body 61 for attaching the antenna support posts 63.

Figure 9:
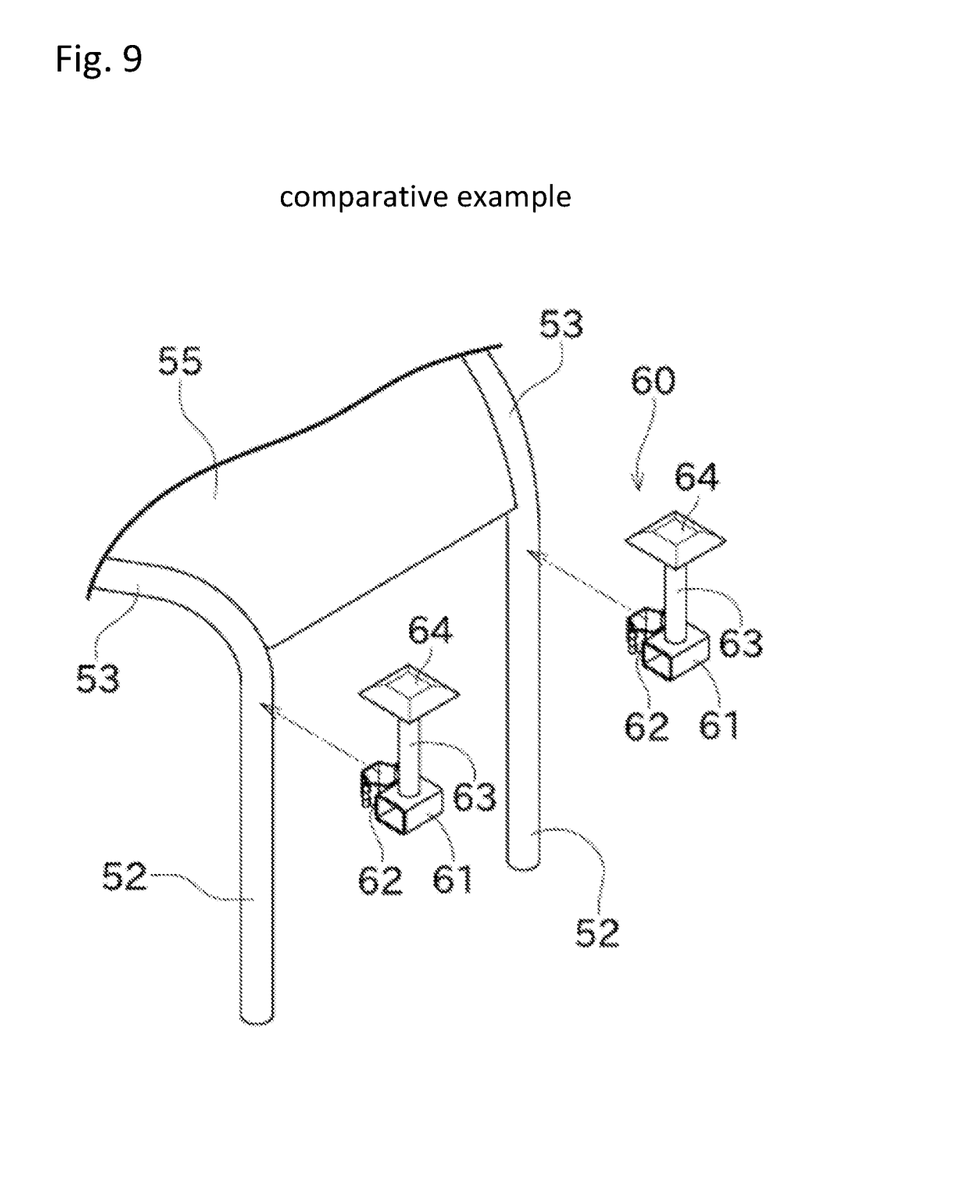
FIG. 9 is a schematic view illustrating a comparative example in which a pair of antennas is attached separately.

In the configuration of the above-described embodiment and modifications, the two GNSS antennas 64 are connected to the same base body 61. Accordingly, the relative position of the GNSS antennas 64 is fixed and known. This allows the process of registering the relative position of the two GNSS antennas 64 with respect to the revolving work vehicle 1 to be performed easily and accurately, compared to the configuration in which the base body 61 is split as illustrated in FIG. 9.

The antenna attachment structure 60 may be disposed to connect the pair of right and left front support columns 54 together. However, since the space in front of the front support columns 54 is narrow due to the work equipment 13 and the like, it is preferable to attach the antenna attachment structure 60 as illustrated in the above embodiment. The antenna attachment structure 60 may also be disposed to connect the rear support columns 52 and the front support columns 54, which are arranged front to back, together. However, since the space between the rear support columns 52 and the front support columns 54 is the space used for the ride of the operator, it is preferable to attach the antenna attachment structure 60 as in the above embodiment.

As described above, the revolving work vehicle 1 according to the embodiment described above includes the lower traveling body 11 and the upper revolving body 12. The upper revolving body 12 is supported revolvably by the lower traveling body 11. The upper revolving body 12 includes the engine 34, the operator seat 37, the roof 55, the rear support columns 52, the base body 61, the antenna support posts 63, and the GNSS antennas 64. The engine 34 is disposed at the rear section of the upper revolving body 12 and drives (by driving the hydraulic pump unit 35) at least the lower traveling body 11. The operator seat 37 is disposed above the engine 34 and the operator is seated on the operator seat 37. The roof 55 is disposed above the operator seat 37. The rear support columns 52 are provided as a pair and extend upward from the rear section of the upper revolving body 12 to support the roof 55. The base body 61 is attached to both of the pair of rear support columns 52 so as to connect them together. The antenna support posts 63 are provided as a pair and extend upward from the base body 61 at positions not overlapping the roof 55 in plan view. The GNSS antennas 64 are provided as a pair, and each GNSS antenna 64 is attached to each of the pair of antenna support posts 63.

This facilitates the GNSS setting, because the relative position of the pair of GNSS antennas 64 is fixed and known as the GNSS antennas 64 are connected to the same base body 61 via the antenna support posts 63. By attaching the GNSS antennas 64 using the rear support columns 52 in the positional relationship described above, the GNSS antennas 64 can be disposed at positions where the radio waves from the GNSS satellite are hardly blocked by the roof 55 or the like.

In the revolving work vehicle 1 of the above embodiment, the base body 61 includes the pair of attaching members 62, each attached detachably to each of the pair of rear support columns 52.

This enables reduction in size of the revolving work vehicle 1 in a situation where the GNSS antennas 64 are not necessary (for example, during transportation of the revolving work vehicle 1). If the attaching height of the base body 61 is changeable because, for example, the placement distance between the rear support columns 52 is fixed, the attaching height of the GNSS antennas 64 can be changed.

In the revolving work vehicle 1 of the second modification, the base body 61 includes the first adjustment mechanism 70 capable of changing the placement distance between the pair of attaching members 62.

This allows the base body 61 to be attached to various types of revolving work vehicles 1 having different placement distances between the rear support columns 52. In addition, the attaching height of the base body 61 can also be adjusted for the revolving work vehicle 1 in which the placement distance between the rear support columns 52 changes with height.

In the revolving work vehicle 1 of the first modification, the base body 61, the antenna support posts 63, and the GNSS antennas 64 are located, in plan view, inside a revolving area 100 having an outer edge defined by the trajectory of the outer edge of a counterweight 38, which is disposed at the rear end of the upper revolving body 12, when the counterweight revolves with the upper revolving body 12.

This prevents enlargement of the revolving area 100 due to the attaching members used to attach the GNSS antennas 64.

In the revolving work vehicle 1 of the above embodiment, the revolving area 100 is within the vehicle width of the lower traveling body 11.

Thus, the present invention is applicable to relatively small construction machines in which a major part of the upper revolving body 12 does not extend outside the lower traveling body 11 even during revolving of the upper revolving body 12.

In the revolving work vehicle 1 of the above embodiment, the right and left ends of the base body 61, the antenna support posts 63, and the GNSS antennas 64 are located, in plan view, inside the ends of the lower traveling body 11 in the right-left direction.

Since the members for attaching the GNSS antennas 64 do not protrude from the lower traveling body 11 in the right-left direction, the GNSS antennas 64 or the like are unlikely to collide with obstacles, for example, in a situation where the revolving work vehicle 1 is located in a narrow space.

In the revolving work vehicle 1 of the third modification, the base body 61 includes the second adjustment mechanism 80 capable of changing the placement distance between the pair of antenna support posts 63.

Since the minimum placement distance between the pair of GNSS antennas 64 is fixed according to the specifications of the GNSS antennas 64, the provision of the second adjustment mechanism 80 makes it possible to support the GNSS antennas 64 of various specifications.

Although the preferred embodiment and modifications of the present invention have been described above, those configurations may change, for example, as described below.

The configurations of the above-described modifications can be combined as appropriate. For example, the L-shaped base body 61 of the first modification may be applied to the second or third modification. The first adjustment mechanism 70 of the second modification may be applied to the first or third modification. The second adjustment mechanism 80 of the third modification may be applied to the first or second modification.

The shapes of the constituent components of the antenna attachment structure 60 are illustrated as examples and can be changed, as necessary. For example, the base body 61 or the antenna support posts 63 may not be provided linearly and may include curved portions. The attaching members 62 are not limited to the clamping members, but may be configured to be attached to screw holes or the like formed in the rear support columns 52. Furthermore, the structure described as detachable in the above embodiment may be non-detachable.

DESCRIPTION OF REFERENCE NUMERALS

1 Revolving work vehicle (Construction machine)
11 Lower traveling body
12 Upper revolving body
13 Work equipment
51 Roof support unit
52 Rear support column
53 Roof attaching unit
54 Front support column
55 Roof
60 Antenna attachment structure
61 Base body
62 Attaching member
63 Antenna support post
64 GNSS antenna

The invention claimed is:

1. A construction machine, comprising:
a lower traveling body; and
an upper revolving body revolvably supported by the lower traveling body, wherein
the upper revolving body includes
a prime mover disposed at a rear section of the upper revolving body and driving at least the lower traveling body,
an operator seat disposed above the prime mover and on which an operator is seated,
a roof disposed above the operator seat,
a pair of rear support columns extending upward from a rear section of the upper revolving body and supporting the roof,
a base body attached to the pair of the rear support columns to connect the rear support columns together,
a pair of antenna support posts extending upward from the base body at positions not overlapping the roof in plan view, and
a pair of global navigation satellite system (GNSS) antennas, each GNSS antenna being attached to each of the pair of the antenna support posts,
wherein a first antenna support post is placed directly behind a first rear support column, on the base body, and
a second antenna support post is outwardly away from a second rear support column, on the base body which the first antenna support post is placed on, and
the base body is formed of a single piece.

2. The construction machine according to claim 1, wherein
the base body includes a pair of attaching members, each attaching member being detachably attached to each of the pair of the rear support columns.

3. The construction machine according to claim 2, wherein
the base body includes a first adjustment mechanism capable of changing a placement distance between the pair of the attaching members.

4. The construction machine according to claim 1, wherein
the base body, the antenna support posts, and the GNSS antennas are located, in a plan view, inside a revolving area having an outer edge defined by a trajectory of an outer edge of a counterweight, which is disposed at the rear end of the upper revolving body, when the counterweight revolves with the upper revolving body.

5. The construction machine according to claim 4, wherein
the revolving area is within a vehicle width of the lower traveling body.

6. The construction machine according to claim 1, wherein
left ends of the base body, the antenna support posts, and the GNSS antennas are located, in plan view, inside the left end of the lower traveling body in a right-left direction, and
right ends of the base body, the antenna support posts, and the GNSS antennas are located, in plan view, inside the right end of the lower traveling body in the right-left direction.

7. The construction machine according to claim 1, wherein
the base body includes a second adjustment mechanism capable of changing a placement distance between the pair of the antenna support posts.

8. The construction machine according to claim 1, wherein the base body is attached to the pair of the rear support column by a pair of attaching members respectively,
the first antenna support post is aligned with the first rear support column and a first attaching member, on the base body, and
the second rear support column and a second attaching member are aligned, and the second support column is not aligned with the second rear support column, on the base body.

9. An antenna attachment method for attaching a GNSS antenna to a construction machine,
the construction machine including
a lower traveling body, and
an upper revolving body revolvably supported by the lower traveling body and including a pair of rear support columns extending upward from a rear section of the upper revolving body and a roof disposed above an operator seat and supported by the pair of the rear support columns,
the antenna attachment method comprising:
attaching a base body to the pair of the rear support columns to connect the rear support columns together;

attaching the pair of the GNSS antennas to a pair of antenna support posts extending upward from the base body at positions not overlapping the roof in a plan view, placing a first antenna support post directly behind a first rear support column, on the base body, placing a second antenna support post outwardly away from a second rear support column, on the base body which the first antenna support post is placed on, wherein the base body is formed of a single piece.

10. An antenna attachment structure attached to a construction machine including a lower traveling body, and an upper revolving body revolvably supported by the lower traveling body and including a pair of rear support columns extending upward from a rear section of the upper revolving body and a roof disposed above an operator seat and supported by the pair of the rear support columns, the antenna attachment structure comprising:

a base body capable of being attached to the pair of the rear support columns to connect the rear support columns together;

a pair of antenna support posts extending from the base body, wherein a first antenna support post is placed directly behind a first rear support column on the base body, and a second antenna support post is outwardly away from a second rear support column, on the base body which the first antenna support post is placed on, and the base body is formed of a single piece; and a pair of GNSS antennas, each GNSS antenna being attached to each of the pair of the antenna support posts.

* * * * *